Feb. 25, 1964 Y. E. STAHLER 3,122,730

TIME INTERVAL INDICATOR HAVING TWO LENGTHS OF TAPE SYNCHRONOUSLY DRIVEN IN OPPOSITE DIRECTIONS ACROSS A DISPLAY SURFACE SUCH THAT THE TWO APPROACHING ENDS OF THE TWO TAPES INDICATE PASSAGE OF A TIME INTERVAL

Filed Dec. 8, 1960 4 Sheets-Sheet 1

INVENTOR.
YLO ERNEST STAHLER
BY Wade Koontz
ATTORNEY
and
Richard J. Killoren
AGENT Feb. 25, 1964 Y. E. STAHLER 3,122,730

TIME INTERVAL INDICATOR HAVING TWO LENGTHS OF TAPE SYNCHRONOUSLY DRIVEN IN OPPOSITE DIRECTIONS ACROSS A DISPLAY SURFACE SUCH THAT THE TWO APPROACHING ENDS OF THE TWO TAPES INDICATE PASSAGE OF A TIME INTERVAL

Filed Dec. 8, 1960 4 Sheets-Sheet 2

INVENTOR.
YLO ERNEST STAHLER
BY Wade Koontz
ATTORNEY
and
Richard J Killoren
AGENT Feb. 25, 1964 Y. E. STAHLER 3,122,730

TIME INTERVAL INDICATOR HAVING TWO LENGTHS OF TAPE SYNCHRONOUSLY DRIVEN IN OPPOSITE DIRECTIONS ACROSS A DISPLAY SURFACE SUCH THAT THE TWO APPROACHING ENDS OF THE TWO TAPES INDICATE PASSAGE OF A TIME INTERVAL

Filed Dec. 8, 1960 4 Sheets-Sheet 3

INVENTOR.
YLO ERNEST STAHLER
BY Wade Koontz
ATTORNEY
and
Richard J. Killoren
AGENT TIME INTERVAL INDICATOR HAVING TWO LENGTHS OF TAPE SYNCHRONOUSLY DRIVEN IN OPPOSITE DIRECTIONS ACROSS A DISPLAY SURFACE SUCH THAT THE TWO APPROACHING ENDS OF THE TWO TAPES INDICATE PASSAGE OF A TIME INTERVAL Filed Dec. 8, 1960 4 Sheets-Sheet 4

INVENTOR.
YLO ERNEST STAHLER
BY Wade Koontz
ATTORNEY
Richard J. Killoren
AGENT

United States Patent Office 3,122,730
Patented Feb. 25, 1964

3,122,730

TIME INTERVAL INDICATOR HAVING TWO LENGTHS OF TAPE SYNCHRONOUSLY DRIVEN IN OPPOSITE DIRECTIONS ACROSS A DISPLAY SURFACE SUCH THAT THE TWO APPROACHING ENDS OF THE TWO TAPES INDICATE PASSAGE OF A TIME INTERVAL

Ylo E. Stahler, Dayton, Ohio, assignor to the United States of America as represented by the Secretary of the Air Force Filed Dec. 8, 1960, Ser. No. 74,746
4 Claims. (Cl. 340—309.1)
(Granted under Title 35, U.S. Code (1952), sec. 266)

The invention described herein may be manufactured and used by or for the United States Government for governmental purposes without payment to me of any royalty thereon.

This invention relates to a device which gives a time indication such as elapsed time or time-to-go.

One object of the invention is to provide a time indicator wherein zero time is centrally located.

Another object is to provide a time indicator which has a minimum reading error due to parallax at the zero position.

A still further object is to provide a time indicator which provides ease in reading several indications simultaneously.

These and other objects will be more fully understood from the following detailed description taken with the drawing wherein:

FIG. 1 is a schematic showing of a time indicator according to the invention;

FIG. 1*a* shows a working embodiment of the device of FIG. 1 with the tapes in their starting position;

FIG. 2 shows a working embodiment of the device of FIG. 1 with tapes at the end of their travel in the middle of the display area;

FIG. 2*a* is a sectional view of a channel member used in the device of FIG. 2;

The pilot flying an aircraft, particularly in combat, in many respects is very closely tied to time. For a successful mission, it is mandatory to observe strictly a fixed time schedule. This time schedule is determined mainly by the amount of fuel the plane can carry with it, thus limiting the operational range and the mission which has to be completed, such as attacking a hostile target or accomplishing an intercept. In any event, the pilot has to take certain actions in a certain time sequence from the takeoff until the landing. Although the mission itself is determined by geographical parameters such as range and altitude, the easiest way for a pilot as a human being to do his job is to use elapsed time as the yardstick for his various actions. Therefore, next to the main flight control, and navigational displays, a display of various time marks easy to survey and without ambiguities should be provided because, at the present, using the fast flying aircraft, the pilot has not time enough to calculate his actions from the navigational displays. According to this invention, moving tapes are used wherein the shrinking areas show the pilot at first glance the time situation without the need to subtract numerals within his mind. Particular points of attention which the pilot must observe may be indicated by special pointers.

Figure 1:
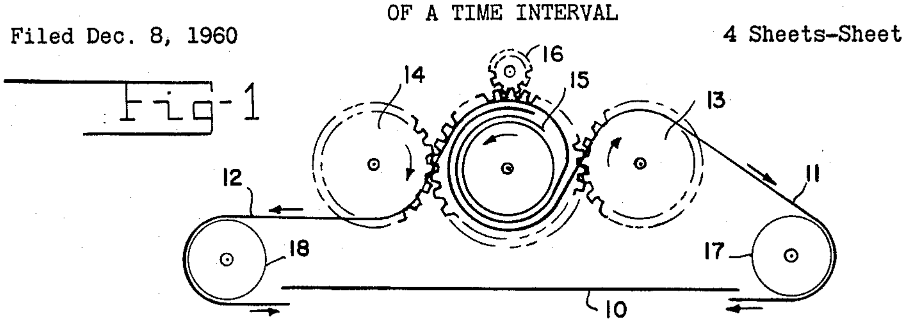

Referring more particularly to FIG. 1 of the drawing, reference numeral 10 refers to a time indicating strip on a display panel in which the time indication is given by a shrinking area between two tapes 11 and 12. The tapes 11 and 12 are driven across the face of strip 10 by means of a pair of auxiliary drums 13 and 14 which are driven by a main drum 15. The main drum is driven by some driving means 16 which will be explained more fully later. The tapes pass around idler rollers 17 and 18 and then past strip 10. At some time the tapes are started to move towards the center of the strip 10 and the time indication is given by the shrinking area displayed on 10 with the zero time being indicated when the two tapes meet at the center of strip 10.

Figure 1A:
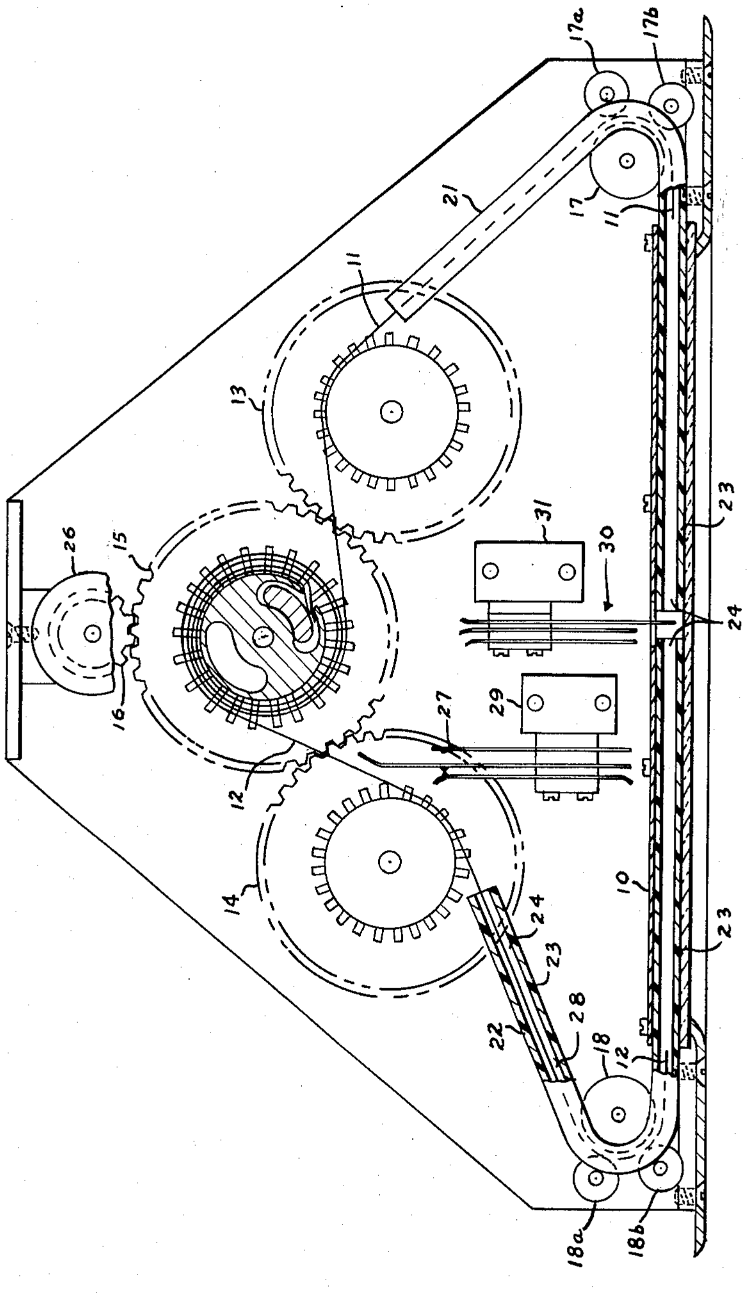
Figures 2, 2A:
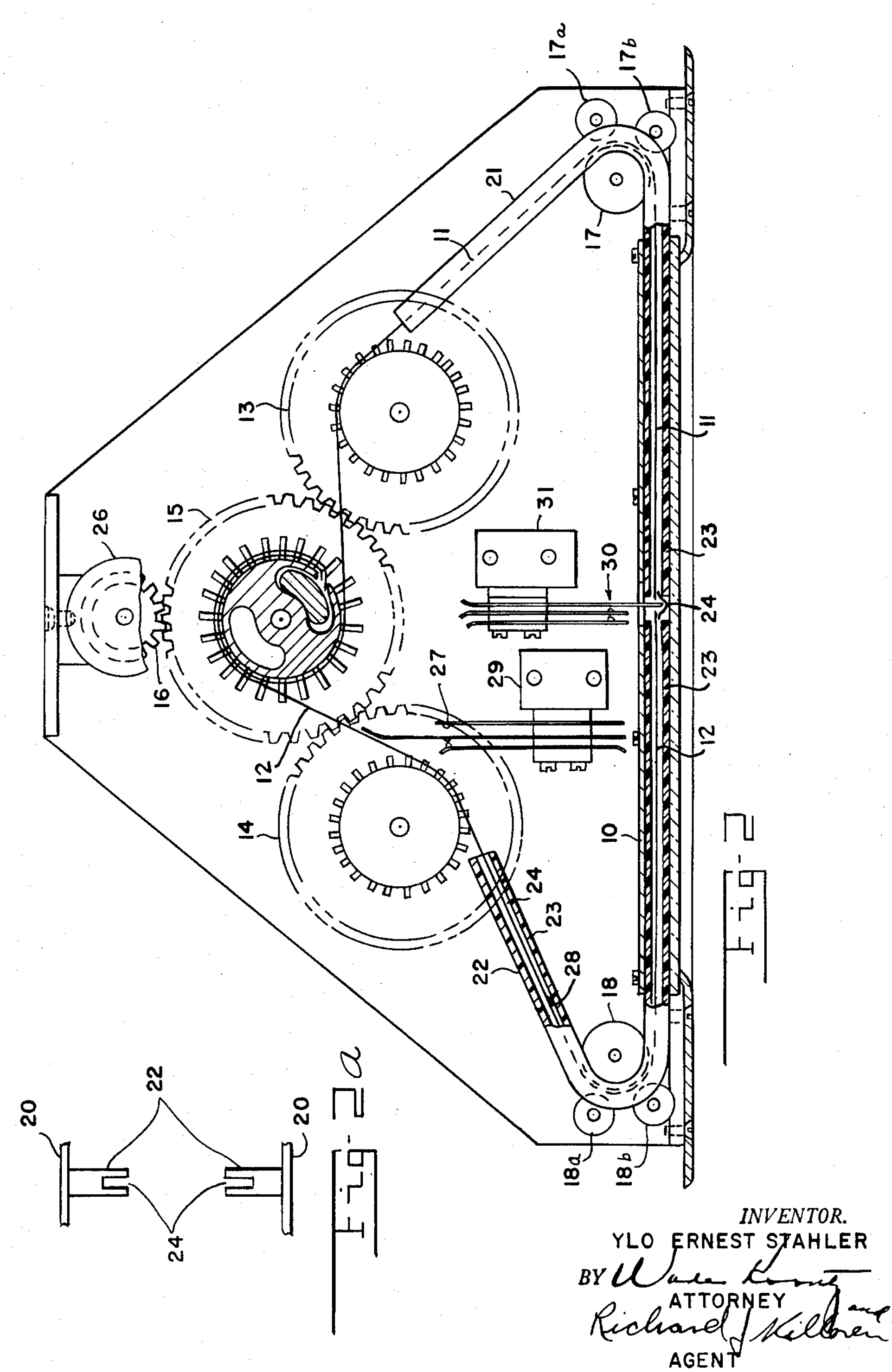
Figure 3:
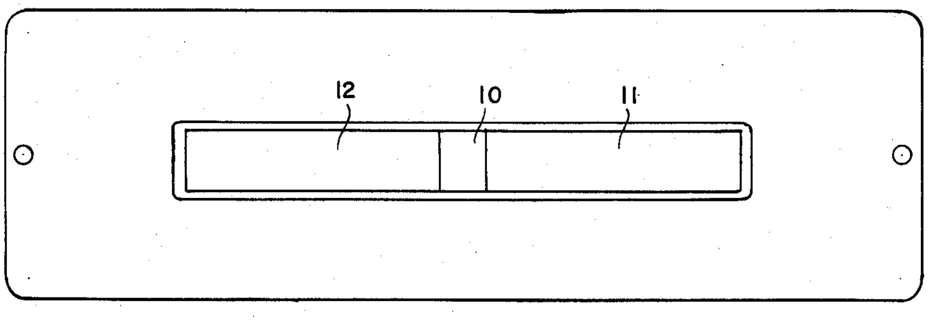
FIG. 3 shows a front view of the device of FIG. 2 with the tapes at an intermediate position in their travel across the display area.

One possible arrangement which may be used is shown in FIG. 1*a* wherein elements corresponding to those shown in FIG. 1 are given like reference numerals. In FIG. 1*a* the tapes 11 and 12 are shown as passing through two guide channel members 21 and 22, which may be made up of upper and lower guide rails attached to the upper and lower housing members 20 as shown in FIG. 2*a*. As shown in the cutaway portions 23, the tape passes through channels 24 within the members 21 and 22. Tapes 11 and 12 are wound around the main drum 15 and pass over the auxiliary drums 13 and 14 before they enter the guide members 21 and 22. The main drum 15 is driven by means of a servo motor 26 which drives the driving means 16. Switch contacts 27 are controlled by a start button 28 on the tape 12 which controls the start relay 29. The stop relay 31 is controlled by a switch 30 which is actuated by means of the tape 11. The time indication is given by a shrinking area of strip 10 between tapes 11 and 12 as shown in FIG. 3.

Figure 4:
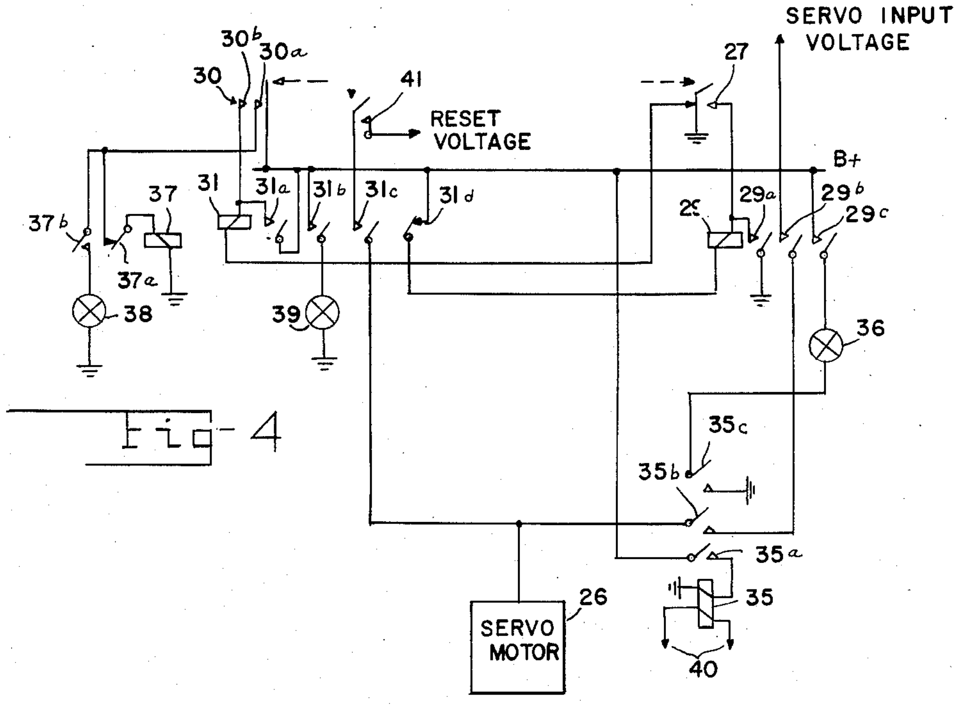
FIG. 4 is a circuit schematic of the control circuit for the device of FIG. 2.

In FIG. 4 the circuit for controlling the device of FIG. 1*a* is shown. The start switch 27 controls the start relay 29. However, operation of this relay does not start the operation of the servo motor. The servo motor waits for the operation of relay 35 which is operated by a command signal from the data link equipment. Switch 30 has two contacts **30*a* and 30*b*. Contact 30*a* controls the flow of current through a relay 37 and an attention light 38. Contact 30*b* controls the stop relay 31 and an attention light 39. In the operation of the device, tapes 11 and 12 are wound around the main drum 15 until the start notch 28 operates switch 27 which connects the right side of the switch to ground, thus activating relay 29 which has a hold contact 29*a*. This also closes contacts 29*b* to one terminal of switch 35*b* and 29*c* through the attention light 36 to one terminal of switch 35*c*. The free ends of tapes 11 and 12 are positioned adjacent the edge of strip 10** as shown in FIGS. 1 and 1*a*. The circuit is now in readiness for a start pulse from the time command equipment applied at terminals 40 which, when received, operates relay 35 which closes hold contact **35*a*, attention light contact 35*c* and completes the circuit through 35*b* to the servo motor 26. The servo motor then begins to turn the driving means 16 which causes the main drum 15 and the auxiliary drums 13 and 14 to rotate which unwinds the tape and forces it to pass through the guide channels 21 and 22 around guide rollers 17 and 18 and across the front of the display 10 thus giving a time indication by means of the shrinking area of display strip 10 visible between tapes 10 and 11 as shown in FIG. 3. When the tape 11 reaches the middle of the display strip as shown in FIG. 2, contact 30*a* is closed which completes the circuit through relay 37 through contacts 37*a*. Operation of relay 37 opens contacts 37*a*, also, closes the contacts 37*b***, thus lighting the attention light 38. When relay 37 is de-energized, contact 37*a* will again close and 37*b* will open. This operation will cause relay 37 to pulsate thus causing the attention light 38 to flash. A short time after contact 30*a* closes contact 30*b* is closed, by additional movement of tape 11 which causes operation of relay 31 which de-energizes relay 29 by opening contacts 31*d*. This interrupts the input voltage to the attention light 36 and the servo motor 26. Contact 31*c* completes the circuit from the servo motor to the reset voltage switch 41. Contact 31*b* completes the circuit through attention light 29. Contact 31*a* is a hold contact for relay 31. The other terminal of the winding for relay 31 is connected to switch 27. A time signal from the time command equipment acts to deactivate relay 35 putting it in its pre-start condition. Operation of reset switch 41 provides a reverse voltage for the servo motor and pulls the tape back until the start notch opens the contact on switch 27 thus deactivating relay 31 and activating relay 29 thus putting the device in condition for another cycle of operation.

Figure 5:
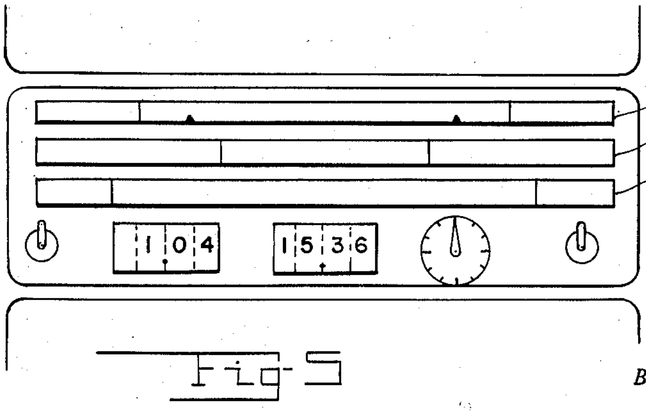
FIG. 5 shows a display panel wherein plural time indicators according to the invention are shown.

While the device has thus far been described with a single display area, it is obvious that several display areas such as 45, 46 and 47 shown in FIG. 5 could be used.

Figure 6:
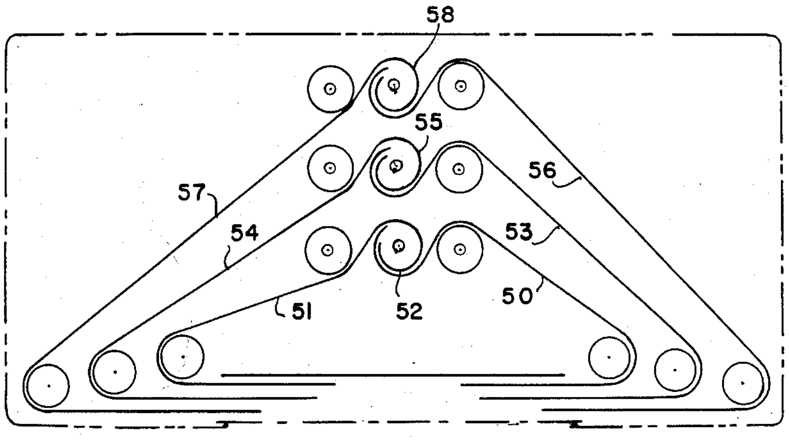
FIG. 6 is a schematic showing of another arrangement for the tapes of FIG. 5.
Figure 7:
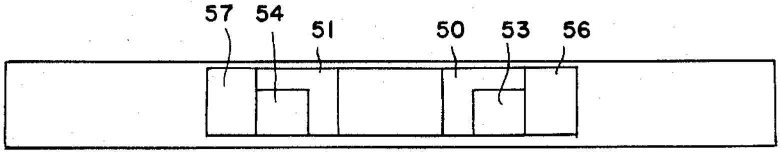
FIG. 7 shows one possible display arrangement for the tapes of FIG. 5.

FIG. 6 shows one arrangement which could be used for driving the three tapes in FIG. 5. In this arrangement, tapes 50 and 51 are driven by a drum 52 and tapes 53 and 54 are driven by a drum 55 and tapes 56 and 57 are driven by a drum 58, each of which would have separate driving means. It is obvious that the tapes need not be shown in a side by side relation as shown in FIG. 5 but may be shown in an overlapping relation as shown in FIG. 7. With the arrangement as shown in FIG. 7, various time indications can be given. For example, the space between tapes from different drums would indicate a time which is related to two time varying functions. It is obvious also that other combinations of time varying functions can be indicated in the manner shown in FIG. 7.

The time controls for the servo motors do not constitute a part of this invention and therefore are not shown.

There is thus provided a device which gives a time indication such as elapsed time or time-to-go, wherein several tapes may be read simultaneously and where there is a minimum error due to parallax at the zero reading position.

While certain specific embodiments have been described in detail, it is obvious that numerous changes may be made without departing from the general principles and scope of the invention.

I claim:

1. A device for giving a time indication comprising: a time display panel; a time indicating strip located on said display panel; a first and a second tape; means for moving said tapes in opposite directions toward each other across said time indicating strip toward the center thereof, to thereby provide a shrinking area between the tapes; a servomotor for operating said tape moving means; means responsive to a time command signal for starting said servomotor to thereby move said tapes across said strip; and a switch, located adjacent the central position of said indicating strip and operated by one of said tapes, for stopping the movement of said tapes.

2. A time indicator comprising: a time display panel having a time indicating strip; a plurality of pairs of tapes; means for moving the tapes of each of said pair of tapes in opposite directions toward each other across said indicating strip in overlapping relation thereto and toward the center thereof to thereby provide a shrinking area between each pair of tapes; means responsive to a time command signal for starting the movement of said tapes across said strip; and means, located adjacent the central position of said strip and operated by one tape of each of said pair of tapes, for stopping the movement of the corresponding pair of tapes.

3. A device for giving time indications comprising: a time display panel; a plurality of time indicating strips located on said display panel; a pair of tapes for each of said strips; means for moving the tapes of each pair of tapes in opposite directions toward each other across a corresponding indicating strip toward the center thereof, to thereby provide a shrinking area between each pair of tapes; a servomotor for operating each of said tape moving means; means responsive to a time command signal for starting said servomotors to thereby move said tapes across said strips; and switch means, located adjacent the central position of said strips and operated by one of the tapes of each of said pair of tapes, for stopping the movement of the corresponding pair of tapes.

4. A time indicator comprising: a time display panel; a plurality of time indicating strips located on said display panel; a pair of tapes for each of said strips; means for moving the tapes of each pair of tapes in opposite directions toward each other across said strips toward the center thereof, to thereby provide shrinking areas between each pair of tapes; a servomotor for operating each of said tape moving means; a power supply for said servomotors; a first and a second switch connected between said power supply and each of said servomotors; means responsive to one tape of each of said pair of tapes in their starting position for closing the corresponding one of said first switches; means responsive to a time command signal for closing said second switches to thereby start the servomotors and to move said tapes across said strips; a switch, located adjacent the central position of said strips and operated by one tape of each of said pair of tapes for stopping the corresponding one of said servomotors; and means for providing a reverse voltage for said servomotors.

References Cited in the file of this patent

UNITED STATES PATENTS

| | | |
|---|---|---|
| 702,808 | Lyman | June 17, 1902 |
| 1,749,390 | Olafson | Mar. 4, 1930 |
| 2,071,274 | Ross | Feb. 16, 1937 |
| 2,084,202 | Kempien | June 15, 1937 |
| 2,238,510 | Stewart | Apr. 15, 1941 |
| 2,429,966 | Snelling | Oct. 28, 1947 |
| 2,482,615 | Fowler | Sept. 20, 1949 |
| 2,683,868 | McKnight | July 13, 1954 |